United States Patent Office 3,415,083
Patented Dec. 10, 1968

3,415,083
APPARATUS FOR TREATING SHEETLIKE MATERIAL UNDER SUB- OR SUPERATMOSPHERIC PRESSURE
Narukazu Okazaki, Wakayama-shi, and Joyu Ishimaru, Tokyo, Japan, assignors of one-half to Wakayama Iron Works Ltd., Wakayama-shi, Japan, a corporation of Japan
Filed Dec. 5, 1966, Ser. No. 598,998
Claims priority, application Japan, Dec. 20, 1965, 40/77,996
6 Claims. (Cl. 68—5)

ABSTRACT OF THE DISCLOSURE

Apparatus for subatmospheric or superatmospheric pressure treatment of sheetlike materials. The apparatus has a liquid seal between the pressure chamber and the outside atmosphere which is a fused metal, which is fused at a low temperature. A pair of endless belts runs through the liquid seal in a manner such that they hermetically clasp the sheetlike material between them as they pass through the liquid seal.

---

This invention relates to a pressure-resistant treatment apparatus which not only can carry out to advantage and with effectiveness such treatments as scouring, bleaching, neutralizing, washing and dipping for dyeing of sheetlike materials, including fibers, yarn, cloth and film, in a treatment zone which is under super- or subatmospheric pressure, but also in which continuous treatment is possible and the defects relative to the material and travel of the endless belts to be used can be satisfactorily overcome, as well as having a structure which is simple and its fabrication is an easy matter. It is particularly directed to an apparatus for treating sheetlike materials, which carries out the treatment by liquid-sealing an atmosphere under sub- or superatmospheric pressure conditions inside a pressure-resistant zone, from an atmosphere external thereto, in a nonfluent manner by means of only the difference in the heads of a low temperature fused metal, hermetically clasping a sheet to be treated between a pair of endless belts which are made of a material which can withstand said fused metal and which will substantially prevent the passage therethrough of said metal, followed by conducting said sheet through said liquid seal part to the introductory part of said pressure-resistant zone, promptly freeing the introduced sheet from said pair of endless belts, and thereafter treating the introduced sheet in said pressure-resistant zone under sub- or superatmospheric pressure conditions, without permitting said pair of belts to pass substantially through the pressure-resistant zone.

The term "pressure" as used hereinafter will mean that the apparatus, method, zone, etc., so referred to is pressure-resistant.

The treatment of fibers, yarn, cloth and other sheetlike materials in a treatment chamber which has been substantially closed by liquid sealing the entry to the pressure treatment zone by means of a fused alloy and/or other liquid sealants has been known heretofore as "pressure treatment." And it is also known to use as such a liquid sealing fused alloy the alloys having a low temperature melting point, for example, the alloys of bismuth, lead, tin and cadmium, or to cause a liquid layer of a liquid sealant containing a treatment liquor to be further present atop the foregoing liquid of a fused alloy, or depending upon the degree of pressure being applied in the treatment chamber, to use as the liquid sealant merely the treatment liquor or other suitable liquids.

Further, in effecting the liquid sealing it is also known to cause the liquid sealant to flow forcibly. Such a fluent liquid seal is not only complicated from the standpoint of equipment and operations, but also rather than giving an advantage results in a greater disadvantage, as hereinafter described, owing to contact of the liquid sealant with the sheet to be treated.

Further, there is also a mechanical sealing method in which the sealing is accomplished by means such as elastic rollers, but in this method not only is the construction of the equipment complicated but also there exist numerous shortcomings including lack of durability of the equipment, etc., and hence a perfect sealing effect cannot be obtained.

The terminology "to liquid seal nonfluently" according to the present invention denotes that the liquid seal is accomplished by the difference in heads of the liquid and that the method of sealing in which the pressure zone is separated from the outside of the zone by means of forcibly flowing a liquid sealant is not included.

In the conventional pressure treatment methods, the material to be treated is delivered into the treatment chamber along with the liquid sealant and in direct contact therewith. As a result, the undesirable effects caused by the liquid sealant cannot be avoided. For instance, the dregs resulting from the oxidation of the low temperature fused alloy by air adhere to the material to be treated and contaminate the same. Furthermore, this oxidation by air becomes excessively great as the treatment temperature rises so as to render it impossible to continue the pressure treatment on many occasions. Again, the low temperature fused alloys are deficient in their resistance to acids. For instance, when dyeing is carried out by means of the pressure treatment method using acid dyes, the liquid sealing alloy, in concomitance with the progress of the treatment, becomes corroded with the passage of time and becomes scaly. This scaly product adheres to the material being treated and the guide rolls and gives rise to undesirable wrinkles, treatment irregularities and spotty dyeing. In extreme cases, the continuance of the operation is even made impossible. In consequence of these undesirable effects on the material to be treated, which is caused by the liquid sealant, the application of the pressure treatment is restricted greatly, and while pressure treatment may be desirable, it becomes impossible to carry it out continuously.

Further, not only is the liquid sealant subject to various restrictions due to such things as corrosion resistance, heat resistance and construction of the liquid seal part, but it also is affected by the treatment liquid with which the material being treated has been previously impregnated. Hence, the choice of the liquid sealant is also greatly restricted. Again, when the liquid sealant is a liquid of fused metal, the material being treated must be thoroughly wetted in advance, or else the metal adheres, with the consequence that with a small amount of pickup the material being treated dries, and especially as the treatment temperature becomes higher. Thus, for treating for the required treatment time, the pickup of the material being treated must be a large amount such as, say, above 75% or otherwise the treatment cannot be carried out. This results in a marked restriction of the types of operations that can advantageously be given the pressure treatment.

Further, even though the material to be treated is wetted thoroughly, there are occasions when the liquid sealant gets adhered to the surface of the material depending upon the condition thereof, with the consequence that spottiness resulting from the treatment occurs or in extreme cases the treatment is rendered impossible of accomplishment.

Again, when the material to be treated enters the liquid sealant a change in its tension results from such factors as the differences in the density, viscosity and pressures and hence the material tends to become wrinkled or folded.

Further, although it is an advantage from the standpoint of the construction of the liquid seal part that the liquid sealant be one the specific gravity of which is as great as possible, in the conventional methods a metal which is normally liquid and moreover which has a great specific weight such as, say, mercury cannot be used, since the liquid sealant is in direct contact with the material being treated.

Thus, despite the increase in recent years of materials requiring pressure treatment, such as the numerous classes of difficultly dyeable synthetic textile fabrics, films and yarns, and hence the desire for the employment of this treatment, its application is greatly restricted in view of the numerous reasons hereinabove noted. Furthermore, even though it is utilized for high temperature and high pressure treatments, it can only be applied at most to conditions on the order of 130° C. and 21 kg./cm.$^2$.

Perceiving that these very adverse technical difficulties of the prior art methods were caused by the direct contact of the material being treated with the liquid sealant and that by avoiding such a direct contact in a favorable manner this pressure treatment method, which had been heretofore unavoidably subjected to a great number of restrictions, could be applied commercially with great advantage and effectiveness under a broad range of pressure treatment conditions from super- to subatmospheric pressure conditions, without giving rise to any of the restrictions which were hitherto inevitably connected with the use of a liquid sealant, we attempted to resolve the numerous technical problems hereinbefore noted by a method comprising hermetically clasping a sheet to be treated between a pair of endless belts which are made of a material which can withstand the liquid sealant as well as preventing the passage therethrough of said metal, passing said sheet through the liquid seal part, freeing the material from its hermetically clasped state in the treatment chamber and, on the other hand, effecting the circulatory travel of said pair of belts such that they pass through the treatment chamber and return to the outside of the apparatus to the aforesaid sheet introductive liquid seal part.

We however encountered another drawback; namely, that in this scheme the pair of endless belts required was of considerable length and hence there was a great disadvantage from the operational as well as the structural standpoint. New technical problems requiring solution appeared. For instance, because the distance traveled by the belts was prolonged, there was a tendency for trouble to occur easily in the hermetical clasping of the sheet to be treated even in the case of a slight slippage. Further, the belts were subjected to the direct effect of the treatment atmosphere, and also since the belts in traveling through the treatment zone occupied a considerable part of this zone, the space that could be utilized for the treatment of the sheet was limited. In addition, since it was necessary to provide guide rolls for the belts in the treatment zone in addition to those for the sheet, the designing of the treatment chamber to maintain its pressure resistance was made much more difficult.

As a result of further research, we found that by limiting the travel of the pair of endless belts to an extent that would be sufficient to just pass through the liquid seal part and not allowing them to pass substantially through the pressure zone, the defects of the hereinabove described scheme could be solved, and hence with all of the many technical drawbacks arising in connection with the material to be treated passing through the liquid seal part and the numerous defects attending the passage of the endless belts through the pressure treatment zone being solved, a very excellent apparatus for the sub- or superatmospheric pressure treatment of sheetlike materials could be provided.

It is therefore an object of this invention to provide a very advantageous apparatus for carrying out the liquid seal method of pressure treatment by overcoming the numerous technical defects that are possessed by the conventional apparatus of this kind.

Other objects and advantages of this invention will be apparent from the following description.

According to this invention, fibers, yarns, fabrics and films can be given pressure treatments continuously or, if desired, semicontinuously or batchwise, at the desired sub- or superatmospheric pressure condition. Accordingly, it is to be understood that the term "sheetlike material," as herein used, is a generic term including within its scope those materials such as fiber and yarn, or sliver and tow thereof, which are capable of being treated in a similar manner as a fabric or a film.

For a better understanding of this invention, the apparatus is more fully described in connection with the accompanying drawings, in which FIG. 1 is a schematic sectional view illustrating an example of the apparatus according to the present invention;

FIG. 2 is a partial schematic view of a modified arrangement of the ends of the belt means at the entrance to the treatment chamber;

FIG. 2' is a partial schematic sectional view of the entrance end of the chamber being operated at a pressure less than atmospheric and with the belts omitted;

Figure 1:
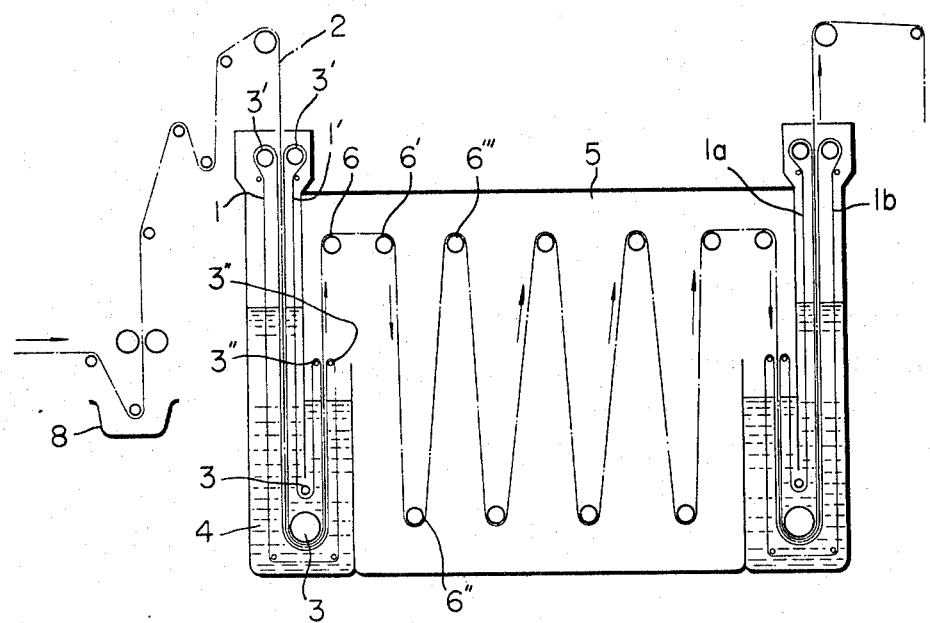
FIG. 1 shows an embodiment where two liquid seal parts are provided in a pressure treatment chamber 5, one at the sheet inlet part and the other at the sheet outlet part. As hereinafter fully described in connection with FIGS. 3, 4 and 5, it is not necessary to provide two liquid seal parts, it being possible for one to serve both as the inlet and outlet for the sheet.

In FIG. 1, a liquid seal zone is formed by means of a liquid sealant 4 at the inlet from which the sheet to be treated is fed into the pressure treatment chamber 5 and also at the outlet from which the treatment-completed sheet is taken out. In this embodiment, these two liquid seal zones have separate pairs of endless belts, i.e., the apparatus as a whole has two pairs of belts. Hence, in this case where the hermetical clasping of the sheetlike material is carried out at the aforesaid inlet and outlet which are each separately provided with a pair of endless belts.

(a) The endless belts do not pass through the pressure treatment chamber 5, as by entering from the inlet and then leaving by a separate outlet; and (b) The endless belts do not travel over a long distance outside the pressure treatment chamber 5 to enter again at the inlet.

Thus the course traveled by the endless belts differs essentially from that of the previously described scheme in these points.

The inlet from which the sheet to be treated is fed in the embodiment of FIG. 1 will be more fully described. In order that endless belts 1, 1' in their travel will clasp a sheet to be treated 2 substantially hermetically at least while passing through the zone which is liquid sealed by a liquid sealant 4, the belts are disposed by means of rolls 3', 3' and 3", 3" which are suitably arranged along with other rolls, and their direction of travel is changed by means of rolls 3, 3. While in FIG. 1 the rolls 3', 3' are provided such that they serve the function of guiding the sheet 2 between the pair of endless belts as well as to hermetically clasp the sheet at the same time, it is also possible, for instance, to provide, as shown by a partial view of said part in FIG. 2, rolls or bars 3''', 3''' for the pair of endless belts 1, 1' which travel, as shown therein, in the direction indicated by the arrows. The disposition of the pair of endless belts to be provided at the outlet for taking out the treated sheet can also be done in like manner.

Figure 2:
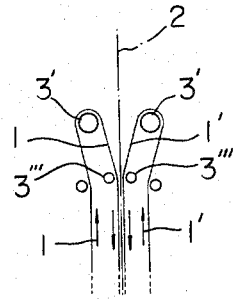
Figure 2:
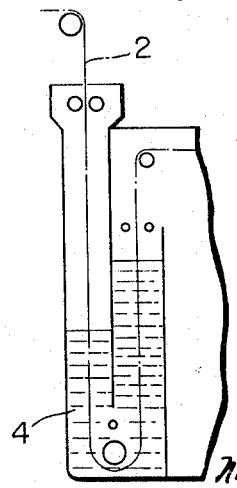

FIG. 2' shows the state of the head of the liquid sealant when operation is carried out with the inside of the pressure-resistant chamber maintained at a reduced pressure. In this figure, parts other than sheet-like material 2, belt rollers and liquid sealant are omitted because they are the same as in FIG. 1.

Further, the hermetic sealing effect between the sheet-like material 2 and the belts 1, 1' can be enhanced to a still greater degree by installing an air suction means between the belts, 1, 1 at a point immediately before they are brought into intimate adherence by means of the rolls 3', 3' or the rolls 3''', 3''' for effecting the hermetic seal, and by a rapid suction of air from between the belts immediately prior to their intimate adherence. Again, the whole of the belts 1, 1' or a suitable width along the whole perimetric edges thereof can be composed of magnetic rubber and the intimately adhered clasping of the sheetlike material can be accomplished by means of pulleys alone. Alternatively, grooves or ridges can be provided along the whole perimetric edges of the belts 1, 1' and fitted with complementary ridges or grooves provided in the rolls 3', 3' or 3''', 3'''. These modifications can be utilized in various combinations. In any event, the pair of endless belts travels through the liquid sealant while being subjected to the liquid pressure of the sealant at the two external sides of the clasping part.

The endless belts to be used in this invention can be made of any belting material so long as it can withstand the liquid sealant and does not permit the passage of substantially any of the liquid sealant therethrough. Thus, a wide range of materials are available for the belts and there is no need for taking into account the treatment conditions or atmosphere inside the pressure treatment chamber. As such belting materials, there can be used materials such, for example, as rubber, synthetic resins, resin-treated fabrics and laminated sheets thereof.

Hence, in accordance with this invention, the distance traveled by the endless belts has been shortened to a marked degree, and also since the travel characteristics mentioned at (a) and (b), above, are possessed by the endless belts, not only are their disposition and construction simplified but also the troublesome slippage adjustment of which is difficult in the case the distance traveled by the belt is prolonged is very readily prevented. Furthermore, since the belts do not travel for any substantial distance through the pressure zone, the restrictions imposed on the material and construction of the belts are few and there is no possibility of the belts themselves becoming damaged. Hence, a thorough high pressure and high temperature treatment can be given to the sheet. Further, as the inlet and outlet are provided with separate pairs of endless belts, the speed of the belts at the inlet and outlet can be readily adjusted separately. Thus, it is possible without the provision of any supplementary means whatsoever to freely adjust or vary the tension of the sheet for rectifying changes which may occur as a result of the treatment or for obtaining the desired end intended by the treatment.

This makes it possible to avoid the adverse effects on the sheet or the roller shafts due to shrinkage of the sheet being treated, which accompany the treatment or overfeeding for improvement of the grade of the sheet. For instance, a shrinkage on the order of about 3–8% in the case of the scouring or caustic treatment of cotton fabrics or the heat treatment of synthetic fibers and a stretch on the order of about 1–8% in the case of the high temperature and high pressure dyeing of synthetic fibers or cotton-synthetic fiber blends and the heat treatment during resinous treatments occur. This shrinkage and stretch have undesirable effects on the material being treated, such as causing it to be distorted, wrinkled, folded, etc., or hinders the operation of the apparatus such that in extreme cases the operation is rendered completely impossible. All of these drawbacks can however be overcome by the present apparatus. Furthermore, the advantages that occur due to the travel of the endless belts at the liquid seal part and other advantages are not sacrificed.

Namely, in contrast to the prior art liquid seal pressure treatments which either do not use an endless belt at all or in which a belt of an auxiliary nature is used which merely has the function of assisting the travel of the material to be treated but no ability to clasp it, in the present invention the sheet being treated is completely protected from the undersirable effects of the liquid sealant when it is being introduced into or taken out of the pressure zone. Thus, not only are the previously noted numerous technical difficulties resulting from the liquid sealant completely surmounted but also there is no need at all for considering the undesirable changes that might result due to the contact between the liquid sealant and a treatment liquor in those cases where the pressure treatment is applied to a material which has been impregnated in advance with a suitable treatment liquor. Hence, the application of pressure treatment which was narrowly restricted in the case of the prior art methods has been freed from its restrictions and it is now possible to conduct pressure treatments over a very broad range.

Further, as the fabric or film, in being treated, is clasped between smooth belts having elasticity during the time it passes through the liquid seal part, the technical difficulties arising from the changes in tension during the passage of the material through the liquid sealant, which became the cause of the appearance of wrinkles and folds, the adjustment of which was difficult in the prior art methods are surmounted. In addition, the choice of the liquid sealant to be used can be very freely made. Hence, it becomes possible to carry out treatments at high temperatures and high pressures which were not practical according to the prior art techniques. For example, a layer of a suitable heat, pressure and corrosion resisting liquid whose specific gravity is lower than that of the low temperature fused metal liquid can be floated on that side of the latter adjacent to the atmosphere of the treatment chamber and the treatment be carried out without any consideration at all as to whether the material being treated will be adversely affected. Moreover, it becomes possible to use as the liquid sealant a metal such as mercury, which could not be used heretofore.

It is possible in this invention to fill the space above the surface of the liquid sealant with an inert gas such as $N_2$, which serves for the prevention of oxidation of the surface of the liquid sealant.

Several examples of the low temperature fused metal that are usually used are shown in Table I, below.

TABLE I

| Nomenclature | Composition (wt. percent) | | | | Fused Point, °C. | Specific Gravity |
| --- | --- | --- | --- | --- | --- | --- |
| | Bi | Pb | Sn | Cd | | |
| Wood's metal | 50 | 25 | 12.5 | 12.5 | 60.5 | 9.6 |
| Lipowitz's metal | 50 | 26.7 | 13.3 | 10 | 70 | 9.6 |
| Lichtenberg's metal | 50 | 30 | 20 | | 92 | 9.7 |
| Rose's metal | 50 | 25 | 25 | | 94 | 9.5 |

An apparatus according to the invention has been described hereinabove, taking as an example the one illustrated in FIG. 1, which has a liquid seal part at its inlet whereby an atmosphere under sub- or superatmospheric pressure condition in the pressure chamber is liquid sealed in a nonfluent manner from the atmosphere outside the chamber by means of only the difference in the heads of a low fused metal, the liquid seal part being provided with a pair of endless belts which are made of a material which can withstand said fused metal and substantially prevents the passage therethrough of said metal and are so disposed as to not pass substantially through said pressure chamber, said belts hermetically clasping a sheet to be treated while the latter passes through said liquid seal part, and said pressure chamber being provided with a separate outlet having a liquid seal part equipped with a pair of endless belts as in the case of the inlet described above.

In accordance with this invention, the sheet-like materials treated within the pressure treatment chamber, even if directly contacted with the liquid sealant, do not undergo adverse effects in many cases. In such a case, the said materials can be taken out by running them directly through the liquid sealant without nip belts. Furthermore, the treated sheet-like materials in accordance with this invention may be taken out by known mechanical sealing methods such as by nipping them with rolls and by labyrinth packing, and the outlet for taking out these sheet-like materials may also be replaced by known means with which the said known methods are practised.

A method of treating a sheetlike material with the apparatus of this invention will now be described, reference being had to FIG. 1.

Sheetlike material 2 is introduced between the endless belts 1, 1' where it is hermetically clasped between said belts, and while being held in a compressed state between the belts by means of the liquid pressure of the liquid sealant 4 against the outside of the belts such that the intrusion of the liquid sealant is made impossible its running direction is turned in the liquid by means of rolls 3, 3 and it is conducted into the treatment chamber 5. Sheetlike material 2, which has thus been held between the pair of endless belts in a substantially hermetically sealed state at least while it passes through the liquid sealant 4 and has entered the treatment chamber 5, after leaving the rolls 3", 3", which have been disposed at a location a short distance from where it has left the liquid sealant, is freed from its hermetically clasped state by means of suitably disposed rolls 6, 6', 6", 6''' . . . to be fully exposed to the treatment atmosphere by which the desired treatment is carried out. In this case, it is also possible to use a low temperature fused metal layer as the liquid sealant 4 and to provide above this layer a layer of a surfactant. The sheetlike material can be easily held for the desired dwell time by running it about rolls while it is being passed through the treatment atmosphere, or for increasing the treatment time, the material can be held in the treatment atmosphere without the necessity of any other means but by just adjusting the speeds of travel of the belts at the inlet and outlet.

The sheetlike material whose treatment has been completed is conveyed to the outside of the treatment chamber via a liquid seal zone of the outlet part while being hermetically clasped by a pair of endless belts 1a, 1b, which have been provided in a similar manner as at the inlet part in the outlet part of similar construction.

According to this invention, the sheet to be treated 2 is clasped in a substantially hermetically sealed state at least while it is passing the liquid sealant 4 at the inlet of the treatment zone 5 which is under a state of super- or subatmopheric pressure. Then the sheetlike material is freed from this hermetically clasped state in the treatment zone 5, and the endless belts which have been used do not pass for any substantial distance through the treatment chamber.

In the apparatus used in this invention, the configuration and construction of the liquid seal part, the course of travel of the endless belts, the disposition and number of the pulleys and rolls, the class of liquid sealant used and the construction of the treatment chamber are capable of various modifications without departing from the conception of the present invention. Again, since many of the restrictions inherent in the priort art methods can be satisfactorily surmounted, these modifications are possible over a broad range. Further, although omitted from FIG. 1, steam heaters and steam blowing inlets can, of course, be installed in any suitable location inside the treatment chamber 5, provided that they do not hinder the travel of the material being treated. Further, although the embodiment shown in FIG. 1 illustrates an instance where a treatment bath, say, a dye bath 8, is provided externally of the apparatus, this bath can also be provided inside the pressure treatment chamber. Again, the sheet to be treated can also be reciprocatively treated by means of a winding and unwinding means disposed externally of the apparatus. In addition, the liquid seal part can be provided in multi-staged fashion, thus raising or reducing the pressure in the treatment chamber to a considerable degree.

FIG. 2' is a partial view showing, on the other hand, the instance where the treatment is to be carried out with the treatment chamber at subatmospheric pressure.

Figure 3:
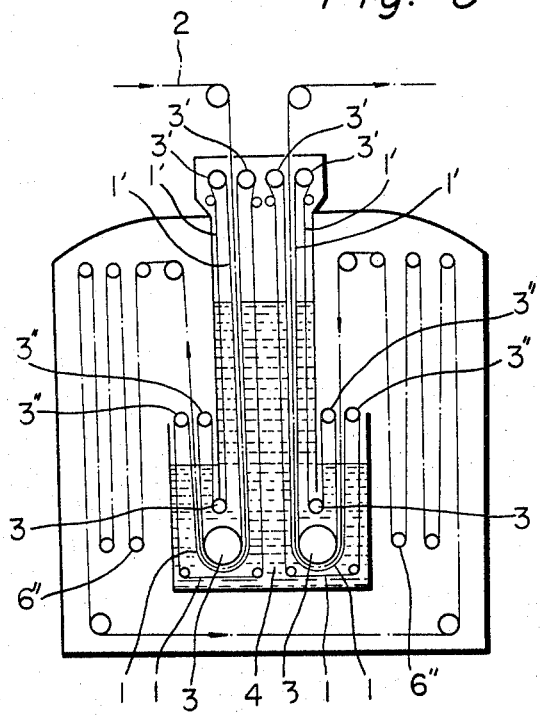
FIG. 3 is a schematic sectional view of another example of the apparatus according to the invention.

FIG. 3, on the other hand, illustrates as one embodiment of this invention a modification wherein the inlet and outlet for the sheet to be treated are positioned together at one point, and the sheet-like material is fed to and removed from the treatment chamber 5 without making direct contact with the liquid sealant 4, which is used to seal the treatment chamber 5 substantially hermetically.

Figure 4:
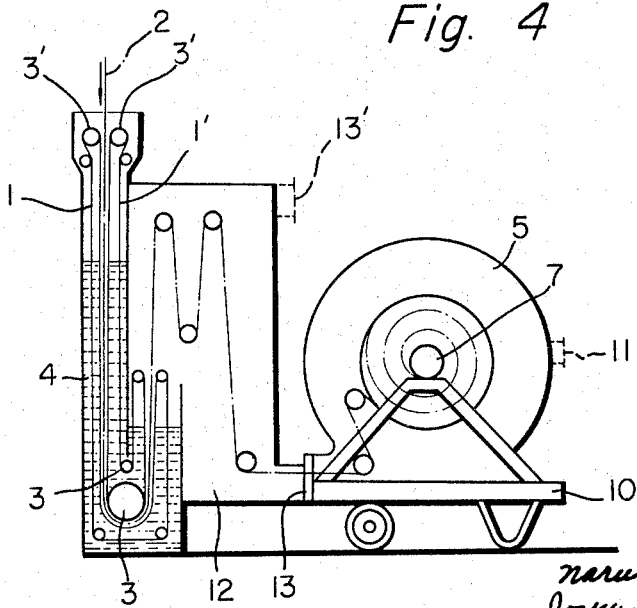
FIG. 4 is a schematic sectional view of still another example of the apparatus according to the invention.

Alternatively, a single batch roller can be provided in the treatment chamber 5, as shown in FIG. 4, and with a very compact apparatus such as this in which numerous guide rolls have not been provided as in FIG. 1 the treatment can be carried out in the pressure chamber during and/or after having wound up the sheetlike material. Again, a double batch roller 9, 9' can be provided in the treatment chamber 5, as shown in FIG. 5, and thus with a similarly compact apparatus and similar treatments it is possible to take out the treated sheet through the same liquid seal part by continuously operating the foregoing roller as a so-called double winding roll and utilizing the travel of the endless belts for clasping the sheet.

Figure 5:
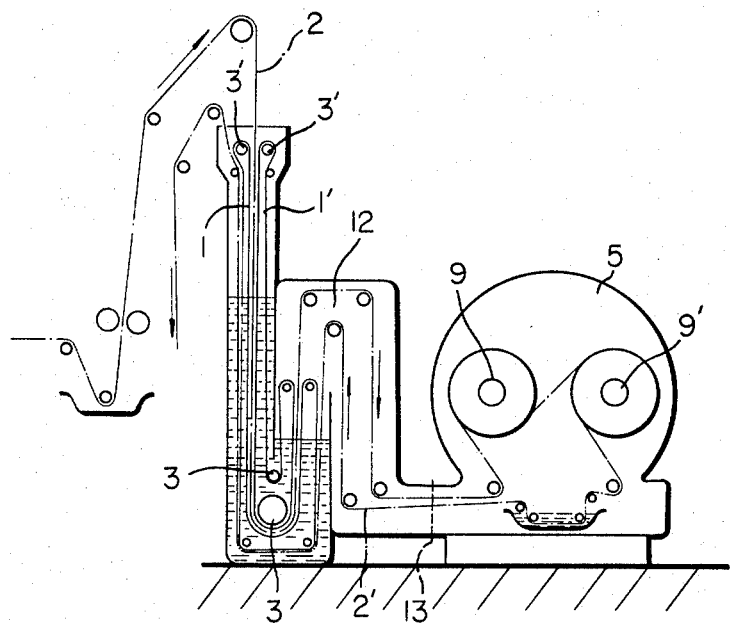
FIG. 5 is a schematic sectional view of another example of the apparatus according to the invention.

The performance of the windup operation inside the pressure chamber, as shown in FIGS. 4 and 5, is something that has never been done in the past. Moreover, in spite of the fact that it was expected that such a mode of windup roll would cause nonuniformity in the pressure treatment effects, the results obtained were exactly the opposite. Furthermore, as a result of having disposed the windup roll in the pressure chamber, the designing of a very compact apparatus has been made possible, which could not have been possible in the case of the prior art pressure treatment chambers. Further, the material being treated can be fully held in this compact apparatus for the desired treatment period. In addition, the installation of numerous guide rolls becomes unnecessary and the construction of the apparatus is greatly simplified.

Further, the possibility of wrinkling or folding of the material disappears, and either semicontinuous or continuous operations also become possible. For instance, in giving fabrics a high temperature superatmospheric pressure treatment, it becomes possible to treat freely those materials which are long or short in length, for example ones which are on the order of 500 meters long to even those which are on the order of 5000 meters. Hence, not only can changes be made readily in the class of sheets to be treated, the class of treatment agents and treatment conditions, but the loss of steam and guide piece is also exceedingly small as well. In addition, there is also the advantage that the treatment conditions can be easily changed in accordance with the requirements of the batch to be treated.

Moreover, since the sheet whose temperature has been raised in the pressure chamber is wound up onto the windup roll in the pressure chamber in saturated steam, its windup is also greatly stabilized. Further, those fabrics which can only with difficulty be stably ran continuously over a plurality of guide rolls, such, for example, as tricot, jersey and stockinet, also can be treated. Hence, the restrictions as to the class of sheetlike materials to which the pressure treatment can be given disappear, and the scope of utilization of such a treatment is broadened further. Furthermore, the fear that either after saturation or adhesion of the treatment liquid or in the case of evaporation in the pressure treatment chamber the treatment liquid will be squeezed out excessively by the fabric being pressed by numerous guide rolls as well as the fear that there will be a variation in the way that the treatment liquid is squeezed out between the edges and the middle of the fabric also disappear completely.

In FIG. 4 the sheetlike material 2 is conveyed between a pair of endless belts 1, 1'. At this time, the sheetlike material 2 is compressed by means of a pair of rolls or bars for hermetically sealing the material, at a suitable place prior to its entry into the liquid sealant 4 and is then clasped hermetically between said endless belts 1, 1' in a state of compression by means of the liquid pressure of the liquid sealant 4 against the outside of the belts such that the intrusion of the liquid sealant is rendered impossible. In this state, the direction of running of the sheetlike material is changed in its direction in the liquid by means of the roll 3 and it is conducted into the pressure treatment chamber 5, which is coupled to a suitable location, say 13, at the distal end of the outlet zone 12. The sheetlike material introduced into the pressure treatment chamber then is given a treatment in the treatment atmosphere while being wound up and after having been wound up onto the windup roll 7 inside the pressure chamber. The distal end of the outlet zone may be provided at, say, 13'. Further, it is also possible to make a modification in which the sheet is turned on the order of a few times by means of a few guide rolls and then introduced into the pressure treatment chamber 5.

This pressure treatment chamber 5 can be so designed that it may interrupt the communication between the outlet zone 12 and chamber 5 at the said end 13 and freely elevate or reduce the pressure within the chamber 5.

In FIG. 4 is shown a cylindrical pressure treatment chamber 5 disposed horizontally and equipped axially thereof with a windup roll 7 inside the pressure chamber. Chamber 5 will serve its purpose so long as it is provided with the windup roll 7 therein. The shape and size can be suitably modified as desired. Further, the pressure chamber can either be made detachable at the distal end 13 of the outlet zone 12 of the hermetically sealed pressure apparatus, thus making the pressure chamber 5 of portable design, or be designed so as to be fixed and so that the treated fabric wound up onto the roll 7 can be taken out along with the roll from the end part of the pressure treatment chamber, i.e., the end by which the windup roll is supported. The latter design is to be preferred in that by doing so the unrestricted changes in treated conditions and also the transfer of the treatment fabric to the ensuring treatment steps is simplified. In the former case, the movement and installation of the pressure treatment chamber can be facilitated by the provision of a carriage 10.

Further, the treated sheet can be taken out by providing outlet 11 in the form of a slit which is sealable, or by operating the belts 1, 1' in reverse to that when introducing the sheet and thus remove the sheet from the inlet end.

On the other hand, it is possible, as shown in FIG. 5, to provide a double batch roller 9, 9' and carry out a continuous operation by using the aforesaid roller as a so-called double winding up roller wherein the sheetlike material is wound up on one hand while on the other hand it is unwound and taken out from the inlet from which it was introduced. While FIG. 5 illustrates a mode wherein the treatment-completed fabric 2' is conveyed through the liquid sealant utilizing the travel of the belt 1, it is of course possible to utilize the travel of the belt 1' in a same manner. The number windup rolls can also be increased, if desired, but this is not necessary. Further, from the mechanical standpoint, one or two rolls is to be preferred.

According to this invention, it is possible to couple a compact pressure treatment chamber 5 having in its pressure chamber either the windup roll 7 or 9, 9', with a compact, hermetically sealed pressure apparatus, the latter being adapted to clasp in a substantially hermetically sealed state the sheet being treated 2 during at least the time it passes through the liquid sealant 4 and then free the sheet from this hermetically sealed state at the outlet zone 12.

Further, the apparatus of the invention may be provided at a suitable location along the course that the belts 1, 1' travels externally of the apparatus, with a shower, washing bath or flushing means for continuously washing the endless belts and thus ensure that the belts are made to travel in a clean state.

We claim:

1. An apparatus for the sub- or superatmospheric pressure treatment of sheetlike materials, said apparatus comprising a liquid seal part wherein the atmosphere under sub- or superatmospheric pressure condition in a pressure-resistant chamber is liquid sealed in a nonfluent manner from the atmosphere outside the chamber by means of only the difference in the heads of a low fused metal, and a pair of endless belts provided in said liquid part, said belts being made of a material which can withstand said fused metal as well as does not substantially permit the passage therethrough of said metal and being so disposed as to pass through said pressure-resistant chamber an insubstantial distance, said belts being adapted to hermetically clasp the sheetlike material while the latter passes through said liquid seal part.

2. An apparatus according to claim 1 wherein a single batch roller is provided in said pressure-resistant chamber.

3. An apparatus according to claim 1 wherein a single batch roller is provided in said pressure-resistant chamber, and wherein said pressure-resistant chamber and said part, including said liquid seal part, for introducing the sheetlike material to be treated to the pressure-resistant chamber are divisibly coupled tightly.

4. An apparatus according to claim 1 wherein a double batch roller is provided in said pressure-resistant chamber.

5. An apparatus according to claim 1 wherein a double batch roller is provided in said pressure-resistant chamber and wherein said pressure-resistant chamber and said part, including said liquid seal part, for introducing the sheetlike material to be treated to the pressure-resistant chamber are divisibly coupled tightly.

6. An apparatus according to claim 1 wherein said pressure-resistant chamber has two said liquid seal parts, one at the inlet and the other at the outlet.

References Cited

UNITED STATES PATENTS

| 3,067,602 | 12/1962 | Brunt | 68—5 |
| 3,352,129 | 11/1967 | Johnson | 68—5 |
| 3,357,212 | 12/1967 | Schiffer | 68—8 |

FOREIGN PATENTS

| 961,638 | 6/1964 | Great Britain. |
| 153,714 | 10/1963 | Russia. |

WILLIAM I. PRICE, *Primary Examiner.*

U.S. Cl. X.R.

34—242